United States Patent
Abe et al.

(10) Patent No.: US 7,638,964 B2
(45) Date of Patent: Dec. 29, 2009

(54) MACHINE HAVING MOVABLE UNIT TO BE CONTROLLABLY DRIVEN BY SERVO MOTOR

(75) Inventors: Hiroyuki Abe, Yamanashi (JP);
Toshiyuki Ogata, Yamanashi (JP);
Hiroyuki Kawamura, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 569 days.

(21) Appl. No.: 11/498,041

(22) Filed: Aug. 3, 2006

(65) Prior Publication Data
US 2007/0052383 A1 Mar. 8, 2007

(30) Foreign Application Priority Data
Sep. 8, 2005 (JP) ............................. 2005-260925

(51) Int. Cl.
*B23Q 15/00* (2006.01)
*G05B 19/404* (2006.01)
*G05B 23/02* (2006.01)

(52) U.S. Cl. .................... 318/560; 318/625; 700/170

(58) Field of Classification Search ................. 318/560, 318/566, 563, 571, 475, 569, 575, 600, 625, 318/632; 700/170, 173; 408/10, 17
See application file for complete search history.

(56) References Cited

U.S. PATENT DOCUMENTS

| | | | | |
|---|---|---|---|---|
| 5,142,210 A * | 8/1992 | Kojima et al. | ................ | 318/566 |
| 5,819,202 A * | 10/1998 | Sato et al. | ..................... | 702/33 |
| 5,914,829 A * | 6/1999 | Kadlec et al. | ............ | 360/78.04 |
| 6,566,835 B1 * | 5/2003 | Yoshida et al. | ............... | 318/569 |
| 7,348,745 B2 * | 3/2008 | Okita et al. | ................ | 318/560 |
| 2005/0137739 A1 * | 6/2005 | Yoshida et al. | ............... | 700/170 |

FOREIGN PATENT DOCUMENTS

EP 1 122 014 8/2001

(Continued)

OTHER PUBLICATIONS

Extended European Search Report, mailed Dec. 6, 2006, and issued in corresponding European Patent Application No. 06254070.3-2206.

(Continued)

*Primary Examiner*—Walter Benson
*Assistant Examiner*—Eduardo Colon-Santana
(74) *Attorney, Agent, or Firm*—Staas & Halsey LLP

(57) ABSTRACT

A speed region of a motor is divided into a region lower than a first switch speed VS1, a region higher than a second switch speed VS2 and a region between the first and second switch speeds. An abnormal load determination level to be compared with an estimated load obtained by an observer is set for each of the regions. An abnormal load determination level AL4 applied when an acceleration exceeds a threshold value is set. The abnormal load determination level AL4 is used for comparison with the estimated load until a predetermined period of time elapses after the acceleration to be commanded to the motor, which once exceeded the threshold level, drops. In other cases, the estimated load is compared with the abnormal load determination level having a value according to the speed. If the estimated load exceeds the compared abnormal load determination level, it is judged that a collision is detected.

8 Claims, 4 Drawing Sheets

FOREIGN PATENT DOCUMENTS

| | | |
|---|---|---|
| EP | 1 166 960 | 1/2002 |
| JP | 03-213248 | 9/1991 |
| JP | 09-305235 | 11/1997 |
| JP | 10-143216 | 5/1998 |
| JP | 2001-150287 | 6/2001 |
| JP | 2002-268742 | 9/2002 |
| JP | 2003-25272 | 1/2003 |
| JP | 2003-117879 | 4/2003 |
| JP | 2004-364396 | 12/2004 |

OTHER PUBLICATIONS

Japanese Notice of Reasons for Rejection, mailed Aug. 28, 2007 and issued in corresponding Japanese Patent Application Nos. 2003-117879 and 2002-268742.

Japanese Office Action issued in corresponding Japanese patent application No. 2005-260925 on Nov. 13, 2007.

* cited by examiner

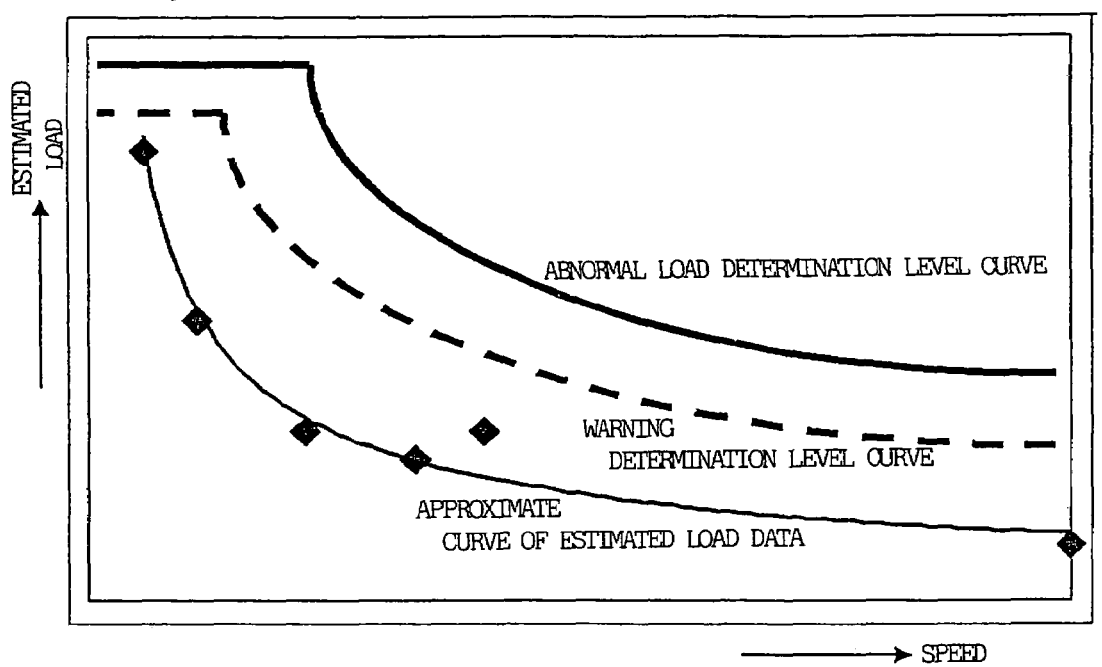

MACHINE HAVING MOVABLE UNIT TO BE CONTROLLABLY DRIVEN BY SERVO MOTOR

BACKGROUND OF THE INVENTION

1. Field of the Invention

The present invention relates to a machine such as a machine tool and various kinds of industrial machines, in which a movable unit is controllably driven by a servo motor, and particularly, to a machine having a function of detecting the collision of a movable unit against other members.

2. Description of the Related Art

There has been known a machine, in which the collision of a movable unit to be driven by a servo motor against other members such as a workpiece or a jig is detected based on an estimated disturbance load torque obtained by estimating a disturbance torque by means of an observer or a drive current value of the servo motor in a machine tool and various kinds of industrial machines. Some examples will be described below.

(a) An output torque from a servo motor is detected, and then, an inertia load is corrected according to the detected torque to obtain an external load. Thereafter, the collision of a movable unit against other members is detected by comparing the obtained external load with a level of a set overload. The level of the overload to be compared with the external load is switched to a high level of the set overload when a movement command is a low speed movement command (i.e., a machining command): in contrast, it is switched to a low level of the set overload when the movement command is a fast feed command (see Japanese Patent Application Laid-open No. 10-143216).

(b) A disturbance torque value is estimated by a disturbance torque observer, and then, an estimated disturbance power value is obtained by multiplying the estimated disturbance torque value by a rotational speed of a motor. It is determined that there is a collision in the case where the estimated disturbance power value exceeds an allowable disturbance power value (see Japanese Patent Application Laid-open No. 9-305235).

(c) A high frequency component is removed by allowing a current feedback to pass through a low-pass filter, thereby achieving a frequency component of a resonant frequency or lower. Based on a value of the current feedback which has passed through the low-pass filter, it is determined as to whether or not a collision occurs. In that case, two low-pass filters for a low speed and a high speed are prepared, so that the filter is switched according to a speed based on a speed command or a speed feedback (see Japanese Patent Application Laid-open No. 2001-150287).

(d) A quantity of a state of an actual machine unit including a motor, a mechanism unit to be driven by the motor and a motor control unit is compared with a quantity of a state of a simulation unit having a model of the motor, a model of the mechanism unit and a model of the motor control unit, so that the comparison result is compared with a set threshold value to detect a contact (see Japanese Patent Application Laid-open No. 2004-364396).

In the case where the collision is detected based on the estimated load torque estimated by the observer, the output torque from the servo motor is increased, and further, the estimated load torque is also increased when the servo motor is accelerated or decelerated. Therefore, an abnormal load determination level based on the estimated load torque has to be increased, thereby raising a problem of the difficulty in detecting a collision with accuracy. In order to solve the above-described problem, there is a known method in which a filter for smoothening a estimated disturbance load torque is provided by means of a dynamic/static friction correction or the like to suppress an increase in estimated load torque at the time of the acceleration or the deceleration.

When the disturbance load torque is estimated by the observer or the like, and then, the collision is detected based on the estimated disturbance load torque, it is desirable that the abnormal load determination level for use in determining the collision should be approximate to and greater than the estimated disturbance load torque generated during a normal operation as possible in order to detect the collision with a higher accuracy. However, since the output torque of the motor is increased and the estimated disturbance load torque is also increased at the time of the acceleration or the deceleration, the abnormal load determination level has to accord with the estimated disturbance load torque at the time of the normal acceleration or the normal deceleration: in contrast, the abnormal load determination level tends to be too high except for the time of the acceleration or the deceleration. Even if the estimated disturbance load torque is smoothened and suppressed by the filter at the time of the acceleration or the deceleration, the torque is fluctuated according to a lubrication state in the drive mechanism or the movable unit, thereby leading to the difficulty in producing a sufficient filter effect.

SUMMARY OF THE INVENTION

An object of the present invention is to precisely detect an abnormal load so as to accurately detect a collision even if the drive state of a servo motor is fluctuated.

The present invention relates to a machine having a movable unit to be controllably driven by a servo motor.

The machine according to a first aspect of the present invention comprises: load torque estimating means for estimating a load to be exerted on the servo motor; means for obtaining an acceleration based on a command given to the servo motor; means for storing therein an abnormal load determination level at the time of increase in acceleration; acceleration comparing means for comparing the obtained acceleration with a set acceleration threshold value, so as to output a signal when the acceleration exceeds the acceleration threshold value; and abnormal load determining means for comparing the stored abnormal load determination level with the load torque estimated by the load torque estimating means when the signal is output from the acceleration comparing means, so as to issue an alarm when the estimated load torque exceeds the abnormal load determination level at the time of increase in acceleration.

The machine may further comprise clocking means for measuring a lapse of time after the obtained acceleration, which has once exceeded the acceleration threshold value, drops to the level lower than the acceleration threshold value. And the abnormal load determining means compares the abnormal load determination level at the time of increase in acceleration with the estimated load torque until a predetermined period of time is measured by means of the clocking means after the acceleration exceeds the acceleration threshold value.

The machine may further comprising: storing means for storing therein the abnormal load determination level according to speeds; speed detecting means for detecting a speed in the servo motor or the movable unit; and means for selecting the abnormal load determination level according to the speed detected by means of the speed detecting means. And the abnormal load determining means, when it does not compare the abnormal load determination level at the time of increase in acceleration with the estimated load torque since there is no output of the signal from the acceleration comparing means, reads an abnormal load determination level corresponding to the speed detected by the speed detecting means, from the storing means, compares the read abnormal load determination level with the estimated load torque, and issues an alarm if the estimated load torque exceeds the read abnormal load determination level. In this case, speed may be divided into a plurality of regions so that the abnormal load determination level corresponding to the speed is set for each region.

The machine may further comprise: means for obtaining an abnormal load determination level corresponding to speed on the basis of a function; speed detecting means for detecting a speed in the servo motor or the movable unit; and means for selecting the abnormal load determination level according to the speed detected by the speed detecting means. And the abnormal load determining means, when it does not compare the abnormal load determination level at the time of increase in acceleration with the estimated load torque since there is no output of the signal from the acceleration comparing means, obtains an abnormal load determination level corresponding to the speed detected by means of the speed detecting means on the basis of the function, compares the obtained abnormal load determination level with the estimated load torque, and issues an alarm if the estimated load torque exceeds the read abnormal load determination level.

The abnormal load determination level may be set based on the estimated load torque generated when the movable unit is operated in a predetermined manner.

A warning may be noticed when the estimated load torque exceeds a warning level smaller by a predetermined quantity than the abnormal load determination level.

The machine according to a first aspect of the present invention comprises: detecting means for detecting a position and a speed of the movable unit; means for calculating a command acceleration based on a position command to be given to the servo motor; storing means for storing therein a first abnormal load determination level which is applied when the calculated command acceleration is equal to or greater than a preset acceleration value, and a second abnormal load determination level which has a value according to the detected speed and is applied when the calculated command acceleration is lower than the preset acceleration value; a disturbance load observer for estimating a disturbance load based on the position command and the detected position and speed; comparing/reading means for comparing the command acceleration with the preset acceleration value and reading the first abnormal load determination level or the second abnormal load determination level stored in the storing means based on the comparison result; and alarm issuing means for comparing the abnormal load determination level read by the comparing/reading means with the disturbance load estimated by means of the disturbance load observer and issuing an alarm if the estimated disturbance load exceeds the abnormal load determination level.

According to the present invention, since the abnormal load determination level is increased up to a determination level at the time of increase in acceleration even if the estimated load torque is increased as the acceleration is increased, it is possible to securely detect a collision of the movable unit in the machine against other members without any erroneous determination of the abnormal load. Furthermore, the collision can be detected with a higher accuracy by varying the abnormal load determination level according to the speed.

BRIEF DESCRIPTION OF THE DRAWINGS

The above-described or other objects and features of the present invention will be obvious from a description given below of a preferred embodiment in reference to the attached drawings. In the drawings:

FIG. 5 is a graph illustrating curves indicating the abnormal load determination levels in the case where the abnormal load determination levels are indicated by the curves.

DETAILED DESCRIPTION OF THE PREFERRED EMBODIMENTS

Figure 1:
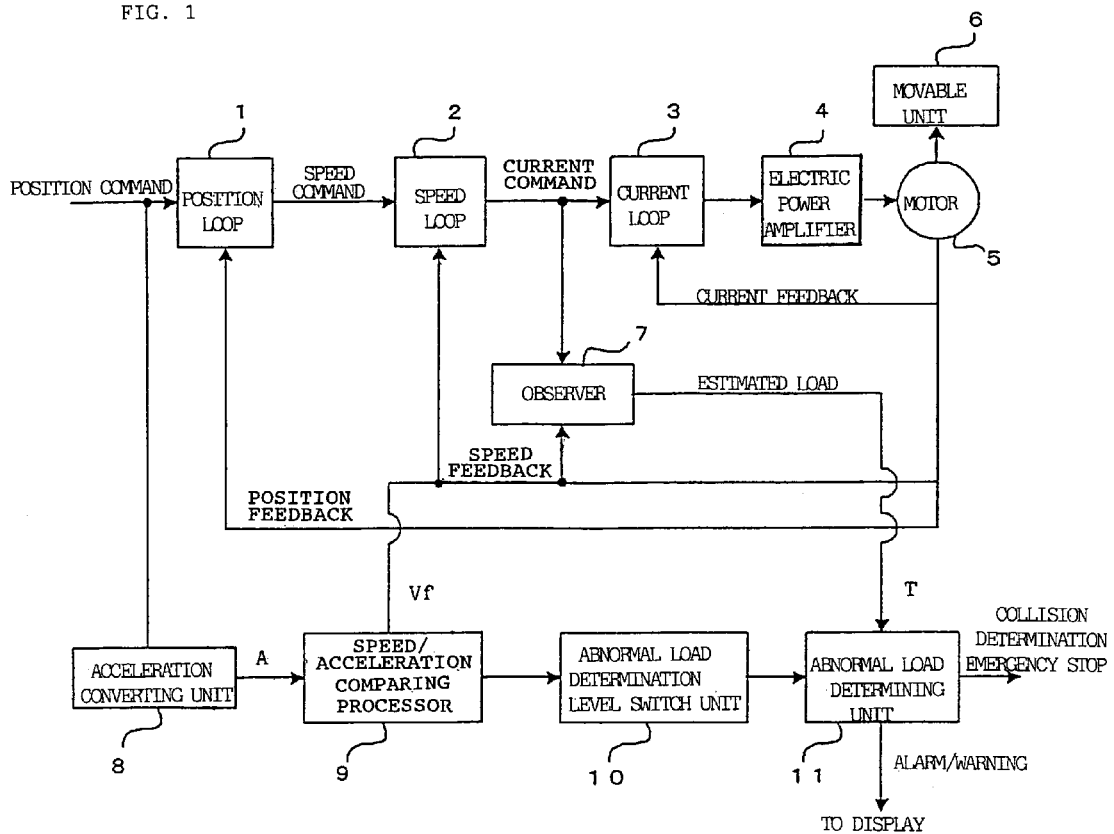
FIG. 1 is a block diagram illustrating a servo control unit for controlling a servo motor for driving a movable unit in a machine according to the present invention.

FIG. 1 is a block diagram illustrating a servo control unit for controlling a servo motor for driving a movable unit in a machine according to the present invention.

A position loop unit 1 performs a position loop control processing, so as to obtain a speed command based on a position command output from a host controller (not illustrated) such as a numerical controller for controlling a machine and a actual position of a servo motor 5 (or a machine movable unit 6) fed back from a position detector (not illustrated) disposed in the servo motor 5 (or the machine movable unit 6) (i.e., a positional deviation is obtained based on the position command and the position fed back from the position detector, and then, the speed command is obtained by multiplying the positional deviation by a position gain).

A speed loop unit 2 performs a speed loop control processing (such as processing of proportion, integration or the like) based on the obtained speed command and an actual speed fed back from a speed detector (not illustrated) disposed in the servo motor 5 (or the machine movable unit 6), thereby obtaining a current command (i.e., a torque command).

A current loop unit 3 performs a current loop control processing based on the obtained current command and a drive current which is detected by, and fed back from, a current detector (not illustrated), and obtains a command to the servo motor 5. An electric power amplifier 4 amplifies the obtained command, thereby controllably driving the servo motor 5 for driving the movable unit 6 in the machine. Moreover, there is provided an observer 7 constituting load torque estimating means for estimating a load to be exerted on the servo motor, for estimating a disturbance load torque T based on a current command output from the speed loop unit 2 and a speed feedback value Vf.

The configuration of the above-described servo control unit is identical to that of a servo control unit provided with an observer for estimating a disturbance load torque in the conventional technique. The processing is performed by processors. In other words, the processing is implemented by a so-called digital servo control.

In the present embodiment, the servo control unit further includes an acceleration converting unit 8, a speed/acceleration comparing processor 9, an abnormal load determination level switch unit 10 and an abnormal load determining unit 11. Incidentally, operational processing in each of the units is also executed by a processor in the servo control unit for controlling the servo motor.

An acceleration A of a command is obtained in the acceleration converting unit 8 based on the position command output from the host controller. Since the position command output from the host controller is equal to a movement amount for a predetermined cycle, a speed is obtained by dividing the movement amount by the cycle, and then, the acceleration can be obtained from a difference in speed between a preceding cycle and a current cycle. The speed/acceleration comparing processor 9 compares the obtained acceleration A with a set acceleration threshold value, and further, compares a speed feedback value with a set speed switch value, described later. Based on these comparison results, the abnormal load determination level switch unit 10 switches an abnormal load determination level for use in determining a collision.

Thereafter, the abnormal load determining unit 11 compares the abnormal load determination level switched and set by the abnormal load determination level switch unit 10 with the estimated disturbance load torque obtained by the observer. If the estimated disturbance load torque exceeds the abnormal load determination level, the abnormal load determining unit 11 determines the occurrence of a collision, and thus, issues an alarm to the host controller, thereby emergently stopping the servo motor 5. Furthermore, the abnormal load determining unit 11 displays the alarm on a display disposed in the host controller or the like. In addition, there is also provided a torque increase warning level in the present embodiment. Therefore, also when the estimated disturbance load torque exceeds the warning level, the alarm is displayed on the display.

Figure 2:
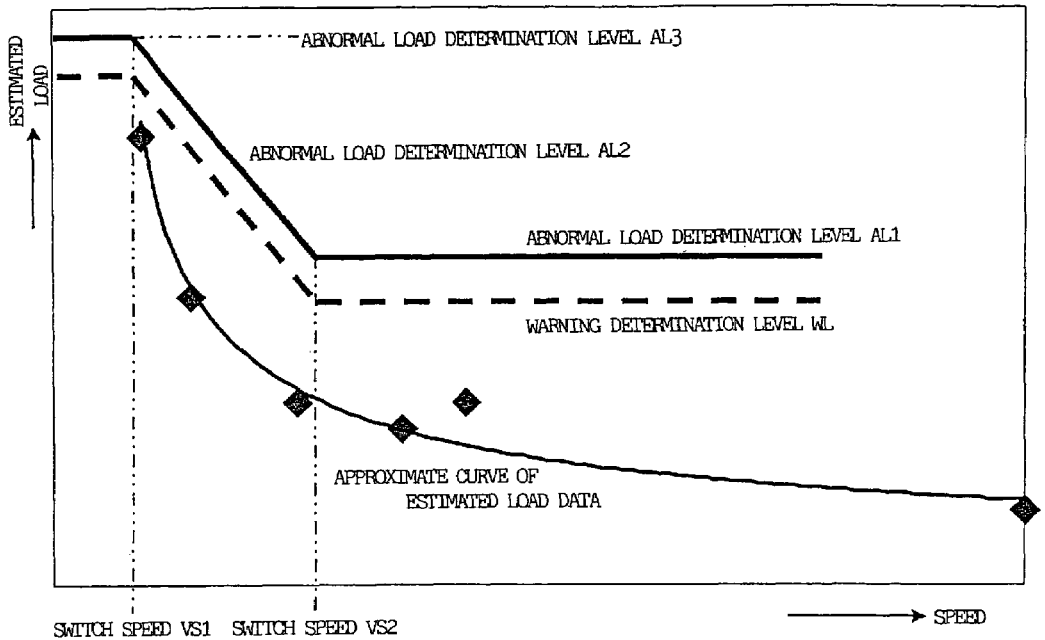
FIG. 2 is a graph illustrating methods for setting abnormal load determination levels according to speeds in the servo control unit illustrated in FIG. 1.

FIG. 2 is a graph illustrating methods of setting the abnormal load determination levels according to the speeds in the present embodiment. The servo motor 5 is driven such that a constant operation is performed with respect to the movable unit 6 in the machine, and then, data on the estimated disturbance load torque detected by the observer 7 at this time is obtained in association with a plurality of speeds. Rhombuses plotted in FIG. 2 indicate the obtained estimated disturbance load torques. Approximate curves indicating estimated load data are obtained based on the data on the obtained estimated disturbance load torques.

Next, the abnormal load determination level is set based on the approximate curve indicating the obtained estimated load data.

In the present embodiment, a speed region of the servo motor is divided into three regions. That is to say, an abnormal load determination level AL3 is set in a region of a speed lower than a first switch speed VS1. In a region of a speed higher than a second switch speed VS2, an abnormal load determination level AL1 is set, wherein fluctuations with respect to the speed on the approximate curve of the estimated load data-become small in the region.

An abnormal load determination level AL2 between the switch speeds VS1 and VS2 is obtained by interpolation between the abnormal load determination levels AL3 and AL1 according to the speed. This is because the estimated disturbance load torque is largely varied according to the speed between the speeds VS1 and VS2.

Moreover, a warning determination level WL is also set at a load value which is lower by a predetermined amount a than that of each of the abnormal load determination levels AL1, AL2 and AL3 obtained in this way.

Figure 3:
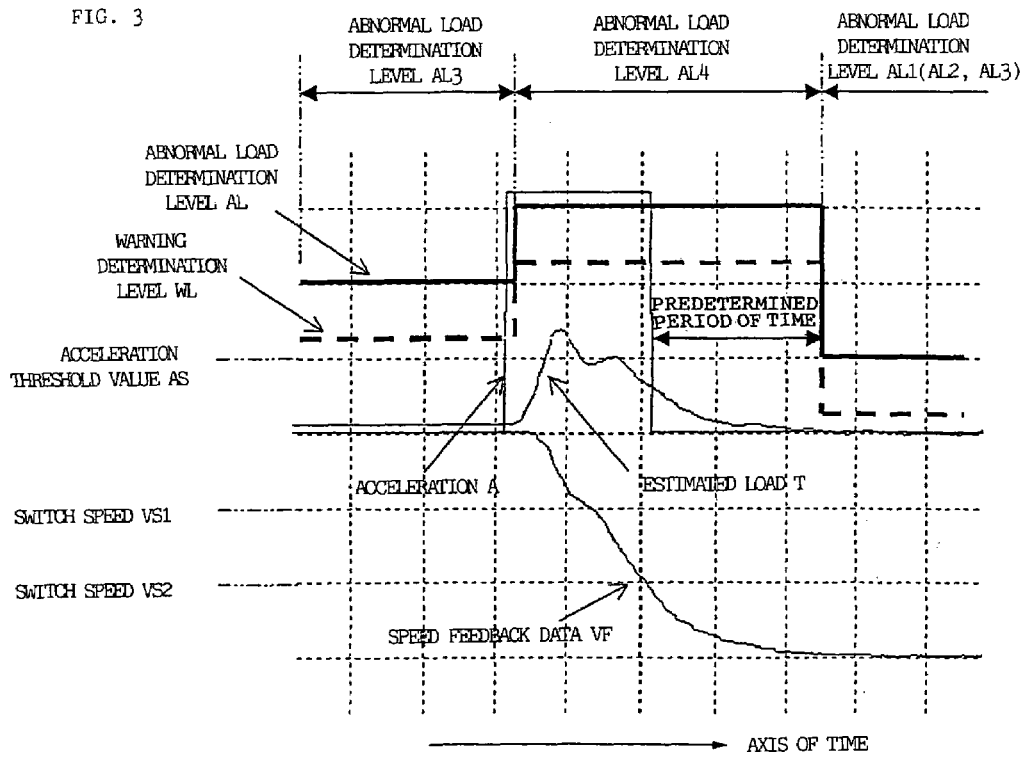
FIG. 3 is a timing chart illustrating an abnormal load determination level varied at the time of increase in acceleration in the servo control unit illustrated in FIG. 1.

In the present embodiment, when the acceleration (i.e., an absolute value) becomes greater, the abnormal load determination level is varied. FIG. 3 illustrates switching to an abnormal load determination level at the time of increase in acceleration when an acceleration has increased.

It is assumed that the servo motor 5 is driven such that the movable unit 6 in the machine is constantly operated, with speed feedback data Vf, the estimated disturbance load torque T estimated by the observer 7 and the acceleration A obtained by the acceleration converting unit 8, as indicated in FIG. 3.

In the present embodiment, when the acceleration A obtained by the acceleration converting unit 8 exceeds an acceleration threshold value AS, an abnormal load determination level AL4 at the time of increase in acceleration is set. In addition, even if the acceleration A is decreased down to the acceleration threshold value AS or lower, the abnormal load determination level AL4 at the time of increase in acceleration is held for a predetermined period of time. This is because the acceleration A is a command acceleration since it is obtained based on the position command value. However, the actual motion of the movable unit 6 is delayed from the command, and therefore, the acceleration is applied with a delay. In consideration of also the delay, even if the acceleration A is decreased down to the acceleration threshold value AS or lower, the abnormal load determination level AL4 at the time of increase in acceleration is held until the predetermined period of time elapses.

In the example illustrated in FIG. 3, the speed of the servo motor is low or zero, lower than the switch speed VS1, so that the abnormal load determination level AL3 is switched to be set. When the servo motor 5 is accelerated such that the acceleration A becomes the acceleration threshold value AS or higher, the abnormal load determination level AL4 at the time of increase in acceleration is switched, and thereafter, the abnormal load determination level is switched to a value according to the speed upon counting the predetermined period of time by means of a timer after the acceleration A becomes the acceleration threshold value AS or lower. The example of FIG. 3 shows a state in which the speed feedback data Vf reaches a speed higher than the switch speed VS2 (>VS1) so that the abnormal load determination level AL4 is switched to the abnormal load determination level AL1.

Figure 4:
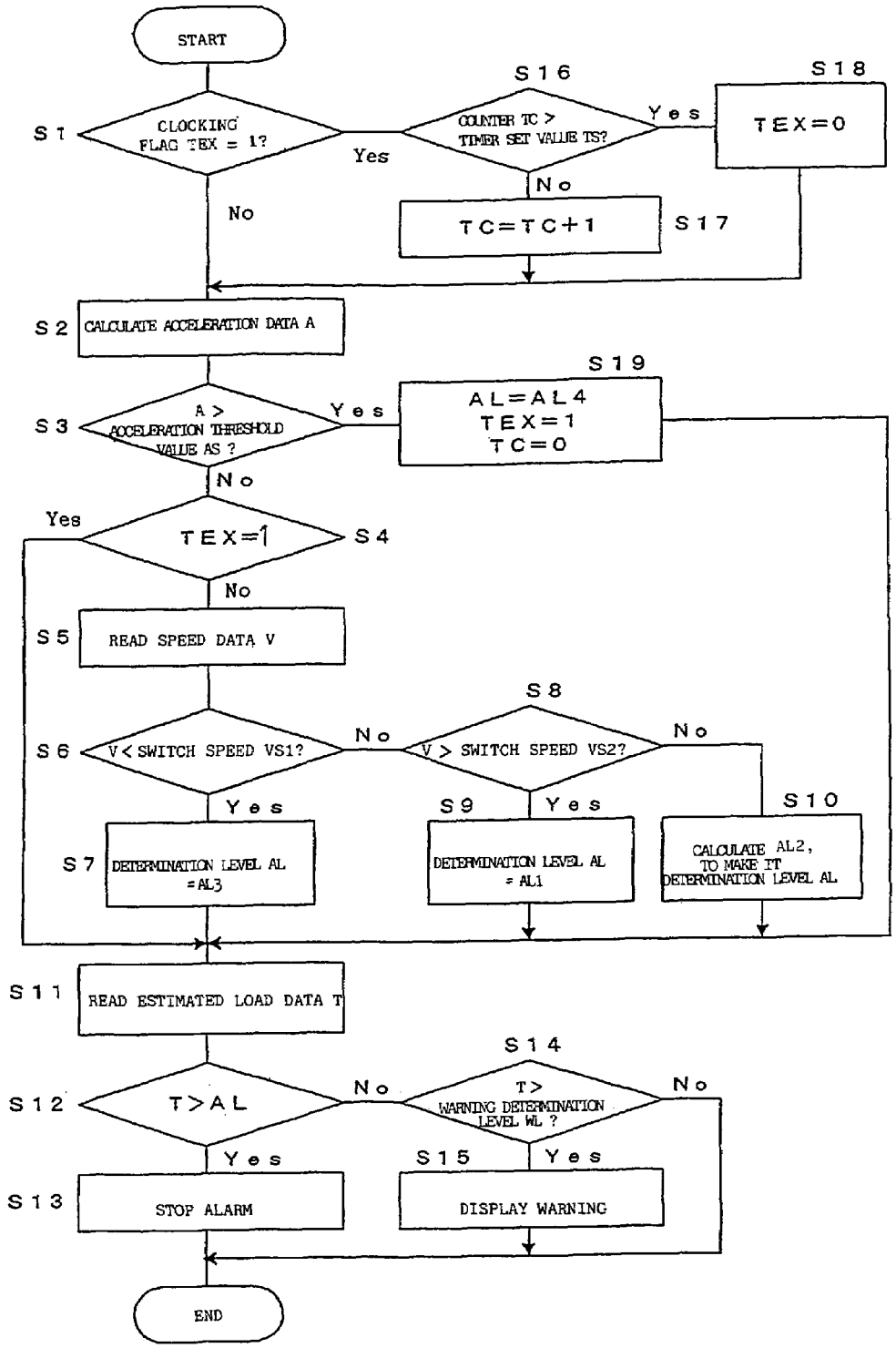
FIG. 4 is a flowchart illustrating an abnormal load determining processing to be performed per predetermined cycle by a processor in the servo control unit illustrated in FIG. 1.

FIG. 4 is a flowchart illustrating an abnormal load determining processing to be performed every predetermined cycle by a processor in the servo control unit. Hereinafter, the processing will be described in reference to the state illustrated in FIG. 3.

First of all, it is judged whether a clocking flag TEX, indicating that a timer counter for measuring a lapse of time after acceleration A, which has once exceeded the acceleration threshold value AS, drops to the level lower than the acceleration threshold value AS is now measuring, is "1" or not (step S1). Since the flag TEX is initially set to "0", the control routine proceeds to step S2, in which the acceleration data A is calculated based on the command from the host controller. And then, it is judged whether or not the magnitude (i.e., the absolute value) of the acceleration data A exceeds the set acceleration threshold value AS (step S3). Unless the magnitude of the acceleration data A exceeds the set acceleration threshold value AS, it is judged whether the clocking flag TEX is "1" (step S4). Since the flag TEX is initially "0", speed data V fed back from the speed detector is read (step S4).

Subsequently, it is judged whether or not the read speed data V is lower than the first switch speed VS1 (step S6), and further, it is judged whether or not the speed data V exceeds the second switch speed VS2 (>VS1) if the read speed data V exceeds the first switch speed VS1 (step S8). If the read speed data V is lower than the first switch speed VS1, the abnormal load determination level Al is set to AL3 (step S7). In contrast, if the read speed data V exceeds the second switch speed VS2, the abnormal load determination level AL is set to AL1 (step S9).

Otherwise, if the read speed data V falls between the first switch speed VS1 and the second switch speed VS2, the abnormal load determination level AL is set to AL2. The level AL2 is designed to be obtained by the interpolation between the levels AL1 and AL3 according to the speed. Therefore, assuming that a difference between the levels AL3 and AL1 is designated by $\Delta AL$ (=AL3−AL1) and a difference between the switch speeds VS1 and VS2 is designated by $\Delta VS$ (=VS2−VS1), the level AL2 is obtained by calculating the following equation:

$$AL2=AL3-\{\Delta AL \times (V-VS1)/\Delta VS\}$$

The level AL2 obtained in this way is set as an abnormal load determination level AL (step S10). Incidentally, the values $\Delta VS$ and $\Delta AL$ are already known by setting the switch speeds VS1 and VS2 and the abnormal load determination levels AL1 and AL3, and therefore, the values $\Delta VS$ and $\Delta AL$ is also set in advance.

In the example illustrated in FIG. 3, since the speed V is initially lower than the first switch speed VS1, the preset value AL3 is set as an abnormal load determination level AL (step S7). After the abnormal load determination level AL is set in this manner, the estimated disturbance load data T obtained by the observer 7 is read (step S11). And then, it is judged whether or not the estimated disturbance load data T exceeds the abnormal load determination level AL (step S12). If the estimated disturbance load data T exceeds the abnormal load determination level AL, an alarm stop command signal is output to the host controller (step S13). In contrast, unless the estimated disturbance load data T exceeds the abnormal load determination level AL, it is judged whether or not the estimated disturbance load data T exceeds the warning determination level WL (step S14). The warning determination level WL is a value obtained by subtracting the constant value $\alpha$ from the abnormal load determination level AL. In other words, WL=AL−$\alpha$.

Unless the estimated disturbance load data T exceeds the warning determination level WL, the processing in the present cycle comes to an end. In contrast, if the estimated disturbance load data T exceeds the warning determination level WL, a warning display command is output into the host controller (step S15), and thus, a warning is displayed on the display.

Hereinafter, the above-described processing in steps S1 to S15 is executed in each cycle as long as the acceleration A obtained in step S2 does not exceed the acceleration threshold value AS.

In contrast, if it is judged in step S3 that the acceleration A obtained in step S2 exceeds the set acceleration threshold value AS, the abnormal load determination level AL4 at the time of increase in acceleration is set, the clocking flag TEX is set to "1", and a timer counter TC is cleared to be "0" (step S19). Then, the control routine jumps to step S11. As a result, the processing in step S11 and thereafter is executed, as described above. Specifically, it is judged whether or not the estimated disturbance load data T exceeds the abnormal load determination level AL4 or the warning determination level WL.

Since the clocking flag TEX is set to "1" in a next cycle, the control routine proceeds from step S to step S16, in which it is judged whether or not the timer counter TC exceeds a set value TS. Unless the timer counter TC exceeds the set value TS, the timer counter TC is incremented by "1" (step S17). The control routine returns to step S2, in which the acceleration data A is obtained, and then, it is judged whether or not the acceleration data A exceeds the acceleration threshold value AS (step S3). If the acceleration data A exceeds the acceleration threshold value AS, the control routine proceeds to step S19.

Hereinafter, as long as the acceleration data A exceeds the acceleration threshold value AS, the processing in steps S1, S16, S17, S2, S3, S19 and S11 to S15 is executed in each cycle. As a consequence, although the timer counter TC is incremented by "1" in step S17, it is cleared to be "0" again in step S19, so that the timer counter TC never exceeds 1.

In the meantime, when it is judged in step S3 that the acceleration data A is the acceleration threshold value AS or lower, the control routine proceeds from step S3 to step S4 in which it is judged that the clocking flag TEX is "1". Since the clocking flag TEX has been set to "1", the control routine proceeds to step S11, and thereafter, the processing in steps S11 to S15 is performed. Hereinafter, the processing in steps S1, S16, S17, S2, S3, S4 and S11 to S15 is executed in each cycle. The timer counter TC is counted up in step S17. During this period of time, the abnormal load determination level AL4 at the time of increase in acceleration is held, as illustrated in FIG. 3.

When it is judged in step S16 that the value of the timer counter TC exceeds the set value TS, the clocking flag TEX is set to "0" (step S18), and then, the control routine proceeds to step S2. The control routine proceeds to steps S2, S3 and S4 in sequence, and further, proceeds to step S5 since the clocking flag TEX is set to "0". As described above, the speed data V obtained based on the speed feedback value is compared with the first and second switch speeds VS1 and VS2, and the abnormal load determination level AL is set according to the value of the speed data V (steps S7, S9 and S10), to be compared with the estimated disturbance load torque T and the abnormal load determination level AL which are output from the observer 7, thereby judging an abnormal load (steps S11 to S15).

In the example illustrated in FIG. 3, the abnormal load determination level AL is set to AL4 (i.e., the abnormal load determination level at the time of increase in acceleration) after acceleration, and then the acceleration A drops to a level lower than the acceleration threshold value AS. Since the speed data V when a predetermined time has elapsed after the drop of acceleration A to the level lower than the acceleration threshold value AS exceeds the second switch speed and becomes large, the abnormal load determination level AL1 is set.

In the above-described embodiment, the speed region has been divided into three, and in the region of the speed lower than the first switch speed VS1, the abnormal load determination level AL is set to AL3, while in the region of the speed higher than the second switch speed VS2, the abnormal load determination level AL is set to AL1. In the region of speed between the first and second switch speeds VS1 and VS2, the abnormal load determination level AL is varied according to the speed in the region. In addition, the region of speed between the first and second switch speeds VS1 and VS2 also may be divided into a plurality of regions, and then, the abnormal load determination level AL may be set in each of the regions. In this case, there are (n+1) regions with the switch speeds VS1 to VSn, and thus, the abnormal load determination levels AL1 to AL(n+1) are set in each of the regions. In the processing in steps S6 to S10 illustrated in FIG. 4, the speed data V is compared with each of the switch speeds VS1 to VSn, so that the abnormal load determination level set with respect to the region including the speed data V is set as the abnormal load determination level AL to be actually compared.

Alternatively, the abnormal load determination level may be indicated by a curve. FIG. 5 is a graph illustrating a curve indicating the abnormal load determination level to be set.

While the servo motor 5 is driven so as to cause the movable unit 6 in the machine to operate in a predetermined manner, data on the estimated disturbance load torque detected by the observer 7 is obtained in association with a plurality of speed values. An approximate curve of the estimated load data is obtained with respect to the speed based on the data on the obtained estimated disturbance load torques. Then the approximate curve is shifted by a predetermined value of load, thereby obtaining an abnormal load determination level curve, and further, obtaining a function expressing the curve.

During the operation of the machine, the abnormal load determination level with respect to the speed data V obtained by speed feedback may be obtained based on the function of the abnormal load determination level curve, to be compared with the estimated disturbance load torque T obtained by the observer 7. The warning determination level may be a value obtained by subtracting the predetermined value $\alpha$ from the determination level obtained based on the function of the abnormal load determination level curve.

Otherwise, in place of the function of the abnormal load determination level curve, the abnormal load determination level curve may be stored in a memory. Specifically, a value on the abnormal load determination level curve with respect to the speed may be stored in the memory per predetermined width. During the operation of the machine, the abnormal load determination level to be stored in association with the detected speed data V may be read from the memory, so that the abnormal load determination level is compared with the estimated disturbance load torque T obtained by the observer 7.

The invention claimed is:

1. A machine having a movable unit to be controllably driven by a servo motor, comprising:
    load torque estimating means for estimating a load to be exerted on the servo motor;
    means for obtaining an acceleration based on a command given to the servo motor;
    means for storing therein an abnormal load determination level at the time of increase in acceleration;
    acceleration comparing means for comparing the obtained acceleration with a set acceleration threshold value, so as to output a signal when the acceleration exceeds the acceleration threshold value; and
    abnormal load determining means for comparing the stored abnormal load determination level with the load torque estimated by the load torque estimating means in response to the signal output from the acceleration comparing means, so as to issue an alarm when the estimated load torque exceeds the abnormal load determination level at the time of increase in acceleration.

2. The machine having the movable unit to be controllably driven by the servo motor according to claim 1, further comprising:
    clocking means for measuring a lapse of time after the obtained acceleration, which has once exceeded the acceleration threshold value, drops to the level lower than the acceleration threshold value,
    wherein the abnormal load determining means compares the abnormal load determination level at the time of increase in acceleration with the estimated load torque until a predetermined period of time is measured by means of the clocking means after the acceleration exceeds the acceleration threshold value.

3. The machine having the movable unit to be controllably driven by the servo motor according to claim 1, further comprising:
    means for obtaining an abnormal load determination level corresponding to speed on the basis of a function expressing a curve of abnormal load detection against speed;
    speed detecting means for detecting a speed in the servo motor or the movable unit; and
    means for selecting the abnormal load determination level according to the speed detected by the speed detecting means,
    wherein the abnormal load determining means, when it does not compare the abnormal load determination level at the time of increase in acceleration with the estimated load torque since there is no output of the signal from the acceleration comparing means, obtains an abnormal load determination level corresponding to the speed detected by means of the speed detecting means on the basis of the function, compares the obtained abnormal load determination level with the estimated load torque, and issues an alarm if the estimated load torque exceeds the read abnormal load determination level.

4. The machine having the movable unit to be controllably driven by the servo motor according to claim 1, wherein the abnormal load determination level is set based on the estimated load torque generated when the movable unit is operated in a predetermined manner.

5. The machine having the movable unit to be controllably driven by the servo motor according to claim 1, wherein a warning is noticed when the estimated load torque exceeds a warning level smaller by a predetermined quantity than the abnormal load determination level.

6. A machine having the movable unit to be controllably driven by the servo motor, comprising:
    load torque estimating means for estimating a load to be exerted on the servo motor;
    means for obtaining an acceleration based on a command given to the servo motor;
    means for storing therein an abnormal load determination level at the time of increase in acceleration;
    acceleration comparing means for comparing the obtained acceleration with a set acceleration threshold value, so as to output a signal when the acceleration exceeds the acceleration threshold value; and
    abnormal load determining means for comparing the stored abnormal load determination level with the load torque estimated by the load torque estimating means when the signal is output from the acceleration comparing means, so as to issue an alarm when the estimated load torque exceeds the abnormal load determination level at the time of increase in acceleration;
    storing means for storing therein the abnormal load determination level according to speeds;
    speed detecting means for detecting a speed in the servo motor or the movable unit; and
    means for selecting the abnormal load determination level according to the speed detected by means of the speed detecting means,
    wherein the abnormal load determining means, when it does not compare the abnormal load determination level at the time of increase in acceleration with the estimated load torque since there is no output of the signal from the acceleration comparing means, reads an abnormal load determination level corresponding to the speed detected by the speed detecting means, from the storing means, compares the read abnormal load determination level with the estimated load torque, and issues an alarm if the estimated load torque exceeds the read abnormal load determination level.

7. The machine having the movable unit to be controllably driven by the servo motor according to claim 6, wherein speed is divided into a plurality of regions and the abnormal load determination level corresponding to the speed is set for each region.

8. A machine having a movable unit to be controllably driven by a servo motor comprising:
- detecting means for detecting a position and a speed of the movable unit;
- means for calculating a command acceleration based on a position command to be given to the servo motor;
- storing means for storing therein a first abnormal load determination level which is applied when the calculated command acceleration is equal to or greater than a preset acceleration value, and a second abnormal load determination level which has a value according to the detected speed and is applied when the calculated command acceleration is lower than the preset acceleration value;
- a disturbance load observer for estimating a disturbance load based on the position command and the detected position and speed;
- comparing/reading means for comparing the command acceleration with the preset acceleration value and reading the first abnormal load determination level or the second abnormal load determination level stored in the storing means based on the comparison result; and
- alarm issuing means for comparing the abnormal load determination level read by the comparing/reading means with the disturbance load estimated by means of the disturbance load observer and issuing an alarm if the estimated disturbance load exceeds the abnormal load determination level.

* * * * *

UNITED STATES PATENT AND TRADEMARK OFFICE
CERTIFICATE OF CORRECTION

PATENT NO.       : 7,638,964 B2
APPLICATION NO.  : 11/498041
DATED            : December 29, 2009
INVENTOR(S)      : Hiroyuki Abe et al.

It is certified that error appears in the above-identified patent and that said Letters Patent is hereby corrected as shown below:

Column 5, Lines 57-62, delete
"An abnormal load determination level AL2 between the switch speeds VS1 and VS2 is obtained by interpolation between the abnormal load determination levels AL3 and AL1 according to the speed. This is because the estimated disturbance load torque is largely varied according to the speed between the speeds VS1 and VS2." And insert the same on Line 56, after "region." as the continuation of the same paragraph.

Column 7, Line 66, change "S" to --S1--.

Signed and Sealed this

Twenty-third Day of March, 2010

David J. Kappos
*Director of the United States Patent and Trademark Office*